United States Patent [19]

Stübs et al.

[11] Patent Number: 4,794,900

[45] Date of Patent: Jan. 3, 1989

[54] IGNITION SYSTEM FOR AN INTERNAL COMBUSTION ENGINE

[75] Inventors: Albert Stübs, Lüdenscheid; Klemens Klüppel, Neuenrade, both of Fed. Rep. of Germany

[73] Assignee: Atlas Fahrzeugtechnik GmbH, Werdohl, Fed. Rep. of Germany

[21] Appl. No.: 946,908

[22] Filed: Dec. 29, 1986

[30] Foreign Application Priority Data

Jan. 16, 1986 [DE] Fed. Rep. of Germany ....... 3601096

[51] Int. Cl.⁴ .............................................. F02P 5/15
[52] U.S. Cl. ................................. 123/416; 364/431.04
[58] Field of Search ...................... 123/416, 417, 425; 364/431.04

[56] References Cited

U.S. PATENT DOCUMENTS

| | | |
|---|---|---|
| 4,081,995 | 4/1978 | Griffith et al. |
| 4,250,858 | 2/1981 | Jeenicke. |
| 4,266,518 | 5/1981 | Nishida et al. ...................... 123/416 |
| 4,276,601 | 6/1981 | Tokuda et al. ...................... 123/417 X |
| 4,419,974 | 12/1983 | Nagase et al. ...................... 123/421 X |
| 4,442,812 | 4/1984 | Mizuno et al. ...................... 123/417 |
| 4,472,776 | 9/1984 | Deleris et al. ...................... 123/417 X |
| 4,586,475 | 5/1986 | Takahashi et al. .................... 123/425 |
| 4,625,691 | 12/1986 | Komurasaki et al. ............... 123/425 |

FOREIGN PATENT DOCUMENTS

| | | |
|---|---|---|
| 3015233 | 11/1980 | Fed. Rep. of Germany . |
| 2042637 | 9/1980 | United Kingdom . |
| 2099918 | 12/1982 | United Kingdom ................ 123/417 |
| 2156905 | 10/1985 | United Kingdom . |
| 2169957 | 7/1986 | United Kingdom . |

Primary Examiner—Tony M. Argenbright
Attorney, Agent, or Firm—Peter K. Kontler

[57] ABSTRACT

An ignition system for an internal combustion engine with the following structure: a pulse generator generates synchronously with the crankshaft rotation angle pulses and one reference pulse; within a first angle interval of the crankshaft rotation, for the determination of a speed value, clock pulses are counted and a load value is converted into a multiple-bit value; accordingly a characteristic field storage is sampled; an ignition counter is preset, which delivers, by the counting of angle pulses, a switching pulse for the ignition signal; the speed value and the load value are stored at the end of the time basis in buffers; the characteristic field storage comprises multiple-bit ignition values for the determination of the ignition angle and for the presetting of the ignition counter. The technical problem is the provision of an ignition system, which has a high detection speed so that within the periods available also at high speeds a reliable determination of the ignition value, under consideration of the necessary correction values, is possible. The angle pulses are utilized as clock pulses. A correction field storage contains multiple-bit correction values in temperature/load/speed characteristic fields and/or octane/load characteristic fields. During a subsequent correction angle interval the count value of the ignition counter is additively or substractively corrected by the multiple-bit correction values.

6 Claims, 4 Drawing Sheets

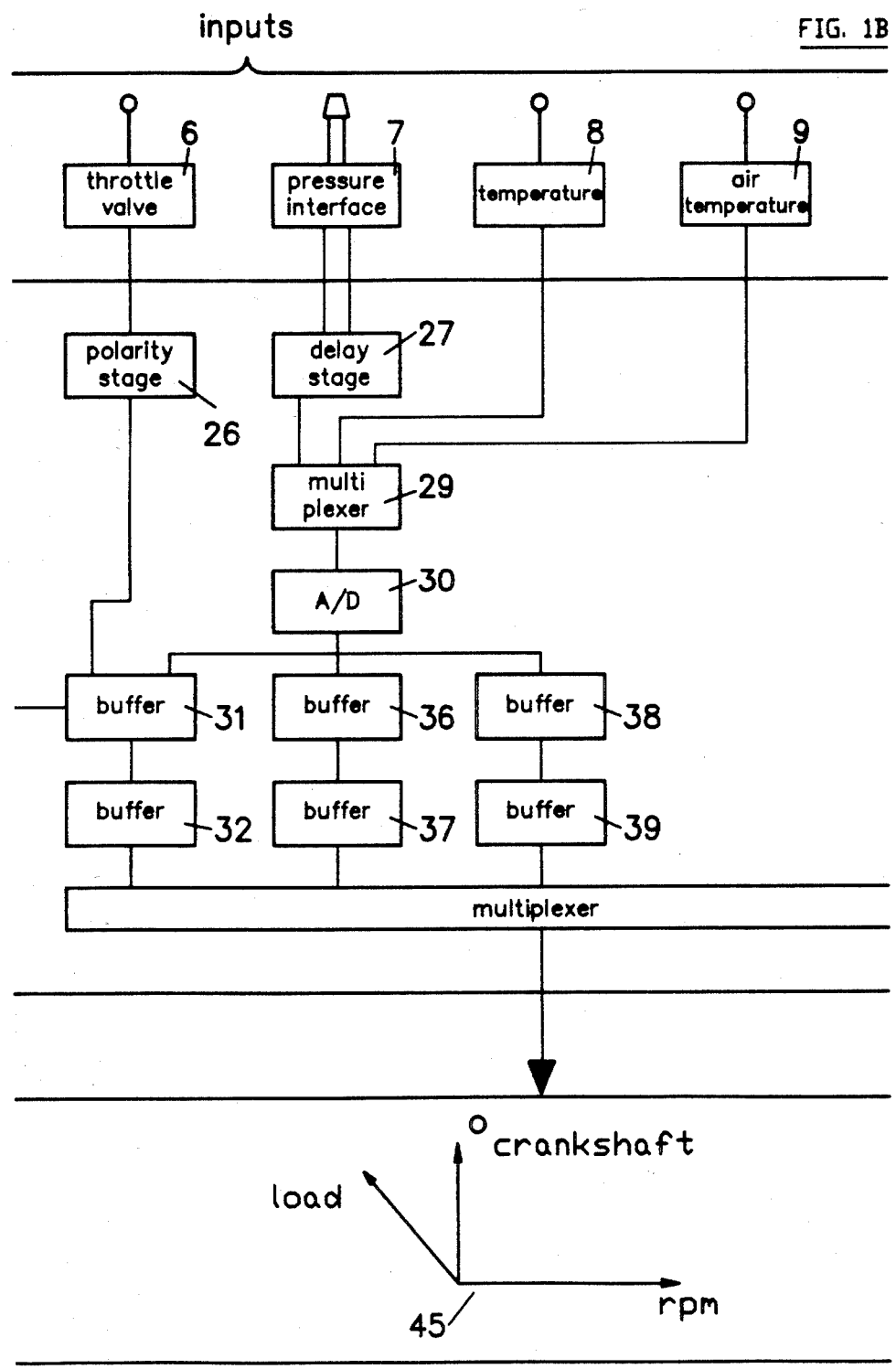

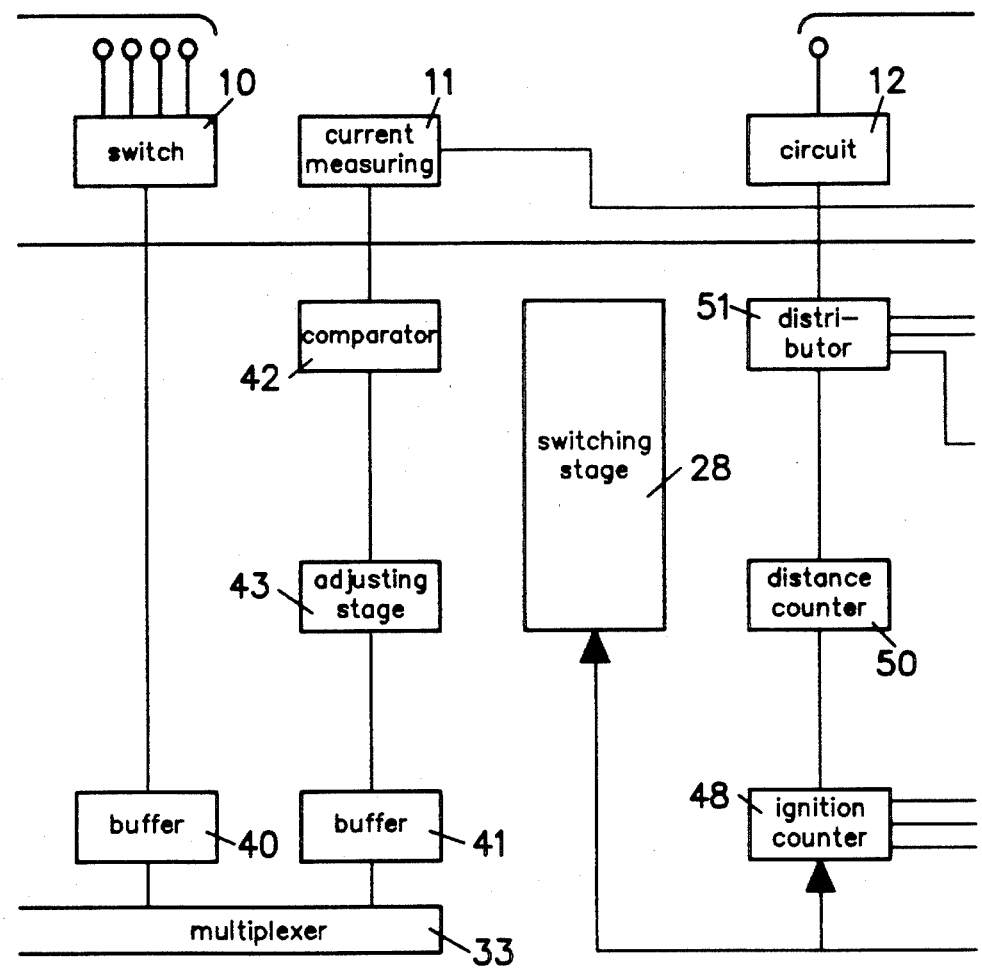
FIG. 1C
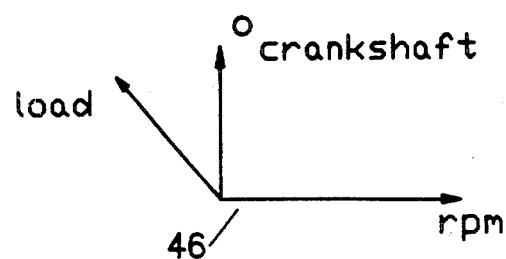

IGNITION SYSTEM FOR AN INTERNAL COMBUSTION ENGINE

BACKGROUND OF THE INVENTION

1. Field of the Invention

The invention relates to an ignition system for an internal combustion engine having the following structure:

(a) a pulse generator generates synchronously with the rotation of the crankshaft angular pulses and one reference pulse;

(b) within a first angular interval of the rotation of the crankshaft, for the determination of a speed value, clock pulses are counted in a speed counter during a time basis and simultaneously a load value is converted to a multiple-bit value;

(c) according to the speed value and the load value a characteristic field storage, storing fixed values, is sampled;

(d) as a function of the storage values of the characteristic field storage an ignition counter is preset, which, by the counting of angular pulses, delivers a switching pulse for the ignition signal;

(e) the speed value and the load value are stored in buffers at the end of the time basis;

(f) the characteristic field storage contains multiple-bit ignition values for the determination of the ignition angle;

(g) to a given angular value the preadjustable ignition counter is preset with the specific multiple-bit ignition value.

2. Description of the Prior Art

An ignition system of the said type is adapted for internal combustion engines with spark ignition (Otto engines) as well as for internal combustion engine with auto-ignition (Diesel engines). In the first case the ignition signal is the voltage signal for the ignition plug, in the latter case the ignition signal is the trigger signal for the injection pump.

In the case of a prior art ignition system the ignition identification field is stored with a coarse speed screen and load screen. The specific ignition angle is gained by the transfer of the stored values of the ignition characteristic field into a microprocessor and by interpolation calculation. This ignition system comes to time limits due to the fact that at high speed the calculations cannot be carried out during the time available for a rotational period. That is particularly true if additional corrections of the ignition value shall be carried out as a function of the temperature and/or the fuel composition, in particular of the octane value.

An ignition system of the above mentioned kind is described in the DE-OS 28 45 024. A consideration of further characteristic values is not provided therein. However, it is evident that a basic characteristic field does not render possible optium engine operation.

The DE-OS 31 16 593 provides the adaption of a permanently stored basic characteristic field of specific engine data in that ignition values corrected in accordance with the individual engine are stored in a correction field, which is provided as read-write storage. This correction characteristic field adapted to a specific engine is then used as a characteristic field. Any adaptation of the storage values to engine characteristic values is not provided therein.

SUMMARY OF THE INVENTION

One object of the invention is the provision of an ignition system, which has a high detection speed so that within the periods available also at high speeds a reliable determination of the ignition value is possible under consideration of the necessary correction values.

In the case of an ignition system of the above mentioned kind this object is solved by the following features:

(h) the angular pulses are utilized as clock pulses;

(i) a correction field storage storing also fixed values contains multiple-bit correction values arranged in temperature/load/speed characteristic fields and/or octane/load characteristic fields;

(j) during a subsequent correction angle interval the counting value of the ignition counter is additively or substractively corrected by the multiple-bit correction values;

(k) at a given angle value the ignition counter is enabled, the angular pulses are counted until an overflow occurs and an overflow pulse is produced to initiate a switching pulse for cylinder ignition.

The ignition system according to the invention differs from the prior art in that for a complete ignition characteristic field in storage locations the specific ignition values and correction values are stored as multiple-bit values in a read-only memory (ROM). If one desires, for example an angular resolution of 1° crankshaft rotation, then one requires 8-bit ignition values. These 8-bit ignition values may be stored in the characeristic field storage. It is also possible to determine the speed increments and the load increments of the characteristic field in the necessary smallness. One may provide, in case of determined speeds, a smaller or larger speed graduation, in order to obtain there a required higher resolution. In addition, one can realize by the ignition system according to the invention just in the range of low speeds characteristic lines of high slope or steepness.

The correction of the multiple-bit ignition value serves for taking into account the engine temperature, particularly the cooling water temperature and/or the intake air temperature. In addition, a correction may be effected as a function of the fuel composition, in particular as a function of the octane value. These correction values are taken from special correction characteristic fields. It turned out that for these correction characteristic fields a coarse screening of the speed increments and of the load increments is sufficient. Correction values are added during an angle interval of a crankshaft rotation sign-correctly in regard to the specific multiple-bit ignition value within the ignition counter so that one obtains a corrected ignition value, which then is ready at the given angle value, at which the ignition counter is enabled.

In order to take into account further operational parameters, it is provided that during the first angle interval simultaneously intake pressure values, cooling water temperature values and/or air temperature values are converted into digital values and are stored temporarily.

Corrections of the basis characteristic field can be effected in that the correction characteristic field contains in a coarse screen temperature-dependent and parameter-dependent speed-load characteristic fields.

An evaluation during each crankshaft rotation also at high speed is secured in that a multiplex sampling of the characteristic fields is carried out.

A quick correction is secured in that the multiple-bit correction values, during the correction angle interval, are counted sign-correctly at a high frequency into the ignition counter.

In the case of an Otto engine with coil ignition it is necessary to control the closing time in order to keep the load of the ignition coil as low as possible at low speeds. For this the invention provides that a coil current measuring circuit is applied to inputs of a speed-dependent closing time characteristic field, and that multiple-bit closing time values of the closing time characteristic field act upon a closing time counter. According to the invention the closing time counter is fully integrated into the ignition system.

Immediately subsequent to each ignition pulse the closing time is determined in that the closing time counter is preset by the switching pulse and is enabled and counts angle pulses, and that it delivers a pulse for the coil current when an overflow value is reached.

BRIEF DESCRIPTION OF THE DRAWING

One embodiment of the invention will be described in the following with reference to the accompanying drawing which is composed of FIGS. 1A, 1B, 1C and 1D and is a schematic block diagram of the ignition system.

DESCRIPTION OF THE PREFERRED EMBODIMENT

Figure 1A:
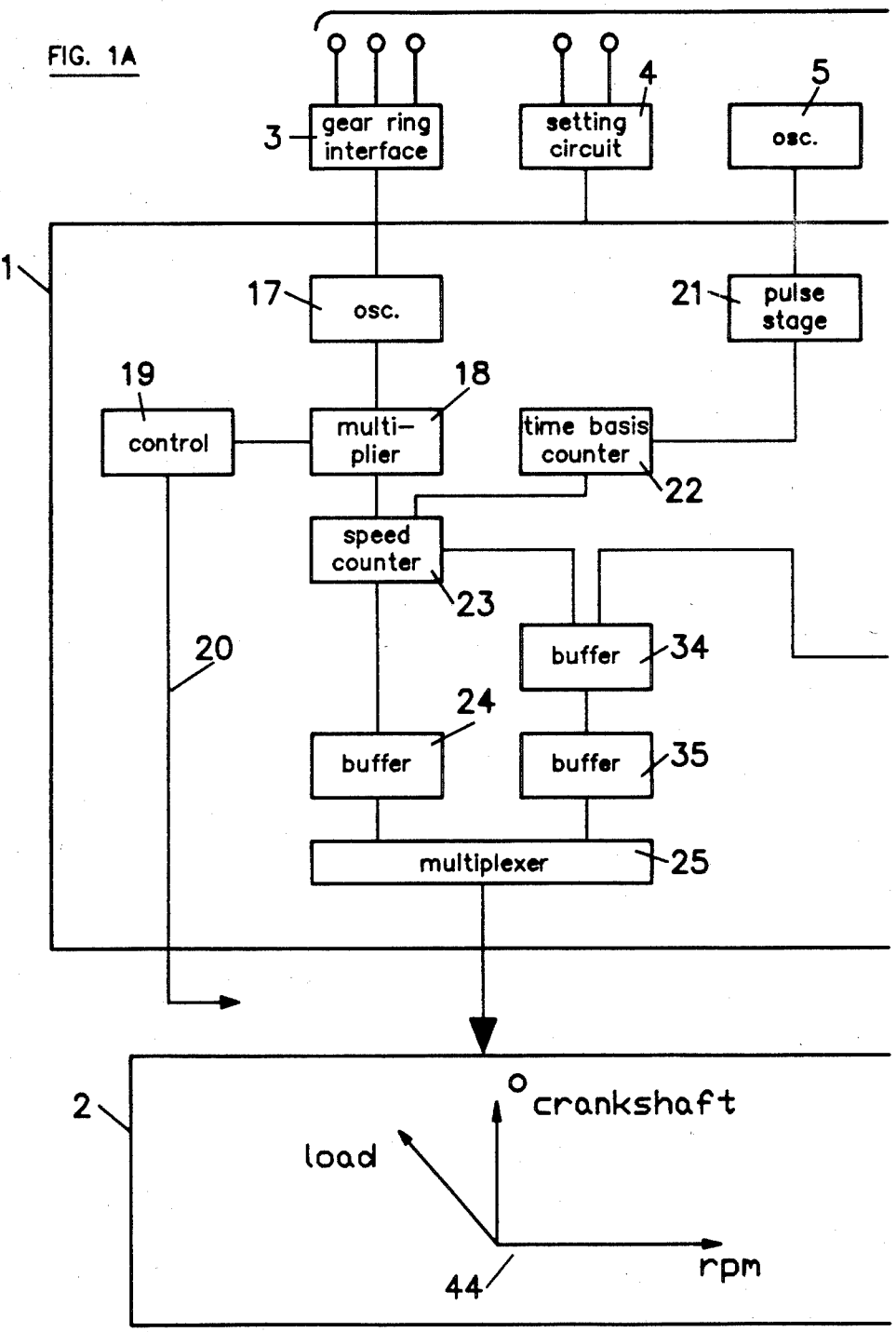
Figure 1D:
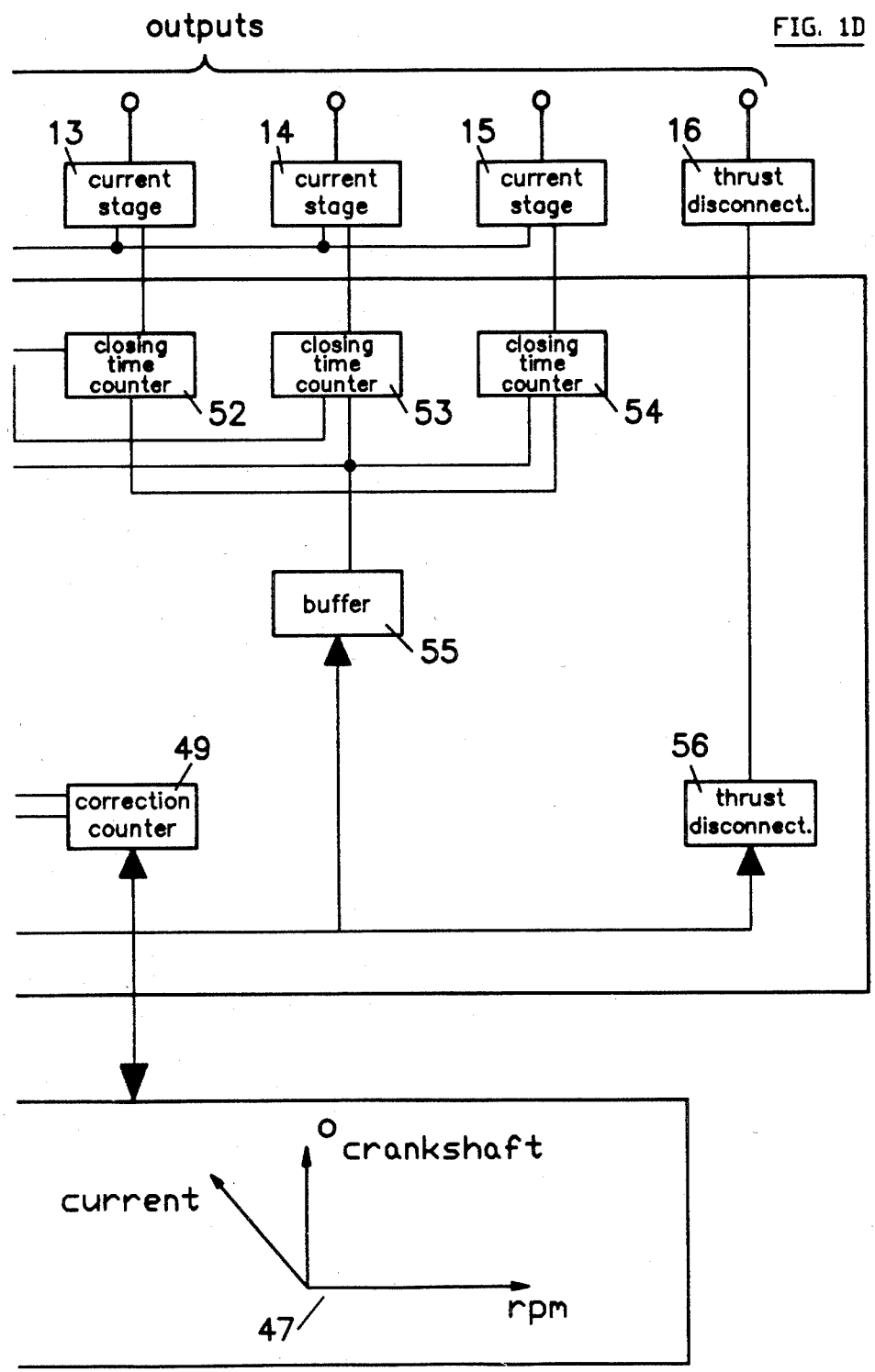

The ignition system comprises a processor 1, which contains logical circuits, counters, and buffers to be described in detail, and a main storage 2, which is provided as a read-only storage (ROM) and in which basic values as well as different fields of characteristic curves are stored. Above the processor 1 interface circuits are present for the input values and output values.

The inputs comprise a gear rim interface 3, which derives tooth pulses from the crankshaft or from a gear rim coupled with the crankshaft. Circuit 4 provides the operating voltage and sets all counters to an initial value after switching the system on. An oscillator 5 supplies clock pulses. A throttle valve switch 6 supplies a signal for the position of the throttle valve, in order to influence thereby the ignition angle accordingly for certain throttle valve positions. A pressure interface 7 measures the pressure in the intake manifold. The engine temperature, particularly the cooling water temperature, is detected in the circuit 8. The circuit 9 detects the intake air temperature. Switch 10 enables manually an adjustment of the octane value or of another characteristic value of the fuel composition in a plurality of digital steps. A current measuring circuit 11 measures the current flowing through the specific ignition coil.

The output values are provided in the following interface circuits: A circuit 12 transmits the speed value to the speed counter. End stages 13, 14, 15 supply the specific current for the ignition coils. The number of the end stages depends upon the number of the cylinders of the internal combustion engine. In case of a mechanical distribution just one end stage is required. Finally an interface circuit 16 for the thrust disconnection exists.

The processor 1 may be a fully integrated module, which contains the necessary logical circuits, buffers, and counters. In detail the input signals are processed by groups; that will be elucidated in the following:

The gear rim interface 3 delivers tooth pulses, the number of which per crankshaft rotation depends upon the number of teeth of the gear rim, e.g. of the starter gear rim. This number of teeth differs for different internal combustion engines. However, it is expedient, if one provides angle pulses with equal increments so that the ignition system can be established in the same manner for all internal combustion engines. It is particularly practical to provide the angle pulses with an increment of 1° crankshaft rotation so that per crankshaft rotation 360 pulses are available. To adapt the pulse frequency an oscillator 17 with high frequency is provided, which is controlled by the tooth pulses. In a multiplier 18, by corresponding multiplication of the tooth pulses, angle pulses are derived. The angle pulses occur, e.g. at an angular distance of 1° crankshaft rotation. In addition, in the multiplier 18 the detection of a reference pulse is effected, which determines the basic angle value.

A control stage 19 delivers switching signals at determined angle values, in order to enable at determined angle values or within determined angle intervals the specific working cycles. The output signals of control stage 19 operate, via a bus 20, the corresponding inputs, particularly the enable inputs of the specific buffers and counters. These control inputs are not shown in detail.

The oscillator 5 cooperates with a pulse stage 21. The clock pulses of the pulse stage 21 are counted in a time basis counter 22 so that after enabling the time basis counter 22 one time basis each is available. The time basis counter 22 enables a speed counter 23, which counts within a corresponding angle interval of each crankshaft rotation during the given time basis the angle pulses. The count value thus obtained of the speed counter 23 is directly proportional to the speed of the internal combustion engine and consequently, a measure of the speed. The count value of the speed counter 23, after expiration of the time basis, is stored in a buffer 24. The output of the buffer 24 is applied to a multiplexer 25, which, under corresponding clock control by the control stage 19, samples the buffer 24 and transmits the storage value to the main storage 2.

The position of the throttle valve switch 6 is detected in a polarity stage 26, the output signal of which influences the pressure detection under corresponding driving conditions. The intake manifold vaccum is detected at the pressure interface as an analog value. This analog value for the pressure is put into a delay stage 27 with adjustable delay. The delay of this delay stage 27 is varied parameter-dependently. These parameters take into account a plurality of operational conditions of the engine, such as acceleration, deceleration, speed, load, pushing operation, engine temperature, and the like. By appropriate adjustment of the delay of the delay stage 27 the response time to a pressure change is influenced in order to thus improve the driving behaviour of the internal combustion engine. The control value for the delay stage 27 is produced in a switching stage 28. The output signal of the delay stage 27 is applied to a multiplexer 29. An A-D converter 30 is positioned on the output of the multiplexer 29; the A-D converter 30 converts the analog values into digital values. The pressure value is stored in a buffers 31 and 32. A multiplexer 33 samples the buffer 32. The pressure value in the buffer 31 is combined with the count value of the speed counter 23 and is stored in further buffers 34 and 35. The buffer 35 keeps at disposal a combined multiple-bit value for the load and the speed of the internal combustion engine. This combined value serves for the necessary corrections.

The circuit 8 provides an analog value of the engine temperature, which is converted, via the multiplexer 29 in the A-D converter 30, into a digital value. Same is further transmitted to the buffers 36, 37. Similarly, a signal provided by the circuit 9 for the intake air temperature, via the multiplexer 29 in the A-D converter 30, is converted into a digital value and is kept at disposal in the buffers 38 and 39.

The octane value adjusted in the switch 10 is transmitted into a buffer 40. In addition, a buffer 41 is provided for the coil current. The coil current of the ignition coil is detected for each ignition in the current measuring circuit 11 and is compared in a comparator circuit 42 with an adjusting value. According to the result of the comparison the adjusting value of an adjusting stage 43 is changed. This value is stored in the buffer 41. The detection and digital conversion of these values is effected simultaneously during the time basis.

The main storage 2 contains a basic field of characteristic curves 44, which is subdivided into speed increments and load increments. In the storage locations identified by the speed increments and the load increments multiple-bit ignition values are stored, which determine the ignition angle in degree crankshaft. Normally an 8-bit value is sufficient for this. The number of the speed increments is dependent on the desired resolution and on the storage capacity available. One may provide e.g. 256 speed increments and 64 load increments. In particular it is also possible to provide, in the case of determined speeds, a smaller speed graduation, in order to thus improve the required resolution.

Furthermore, the main storage 2 contains a plurality of correction characteristic fields 45, which are arranged according to comparatively coarse-gradated speed increments. One can provide approximately 16 correction characteristic fields for different temperature values, particularly different intake air values and engine temperature values. Moreover, a correction characteristic field 46 for the octane value is provided. Finally the main storage 2 contains a closing time characteristic field 47, which contains, as a function of speed increments and current values, multiple-bit closing time values for the closing time t.

These characteristic fields are sampled according to the multiplex technique. Initially the basic characteristic field 44 is sampled.

The multiple-bit values are transmitted into the trigger part of the processor 1. Therein an ignition counter 48 is provided, into which the specific multiple-bit ignition value is transmitted as basic ignition value and preset value. The ignition counter 48 is associated with a correction counter 49, which takes over the multiple-bit values of the correction characteristic fields. These correction values can be transmitted at a high counting frequency into the ignition counter 48 sign-correctly, i.e. additively and subtractively. The ignition counter 48 is enabled at a determined angle value and the angle pulses operate same. When the overflow value is reached, a switching pulse is transmitted into a distance counter 50. The distance counter 50 generates switching pulses in accordance with the number of cylinders of the internal combustion engine. Actually the ignition counter 48 generates at each crankshaft rotation just one switching pulse. A distributor 51 is positioned after the distance counter 50; the distributor 51 distributes the switching pulses to the closing time counters 52, 53, 54. In the case of a six cylinder engine with fully electronic distribution three closing time counters are necessary. A buffer holds the specific multiple-bit closing time value so that the same can be sampled as presetting value for the specific closing time counters 52, 53, 54. The specific output signal of a closing time counter 52, 53, 54 is applied to the end stage 13, 14, 15, which in each case provides the current for the ignition coil. Finally a stage 56 for the thrust disconnection is provided.

The operation of the ignition system is as follows: Starting from the gear rim interface in the multiplier 18 on the one hand angle pulses and on the other hand a reference pulse for a reference angle value of the crankshaft rotation are produced. These angle pulses control the entire system.

A crankshaft rotation is subdivided into different angle intervals, during which the different processings are to be carried out so that during each crankshaft rotation a switching signal for a switching pulse for the ignition signal can be made available. Generally the crankshaft rotation may be subdivided into the following angle intervals:

angle value O: reference angle
angle intervals a: input of basic values
angle intervals b: detection of the speed value during the time basis, A-D conversion of the pressure and temperature values
angle value c: transfer of the basic ignition value into the ignition counter
angle value d: closing time storage
angle intervals e: correction of the basic ignition value
angle value f: enabling of the ignition counter, subsequent generation of the switching pulse for the ignition signal and presetting as well as enabling of the closing time counter.

Following to the reference angle O during an angle interval basic values are put into the processor. Same are system-dependent.

During the time interval b the speed value is determined and the pressure values are converted into digital values. These values are held ready in the buffers 24, 35, 32, 37, 39. By a multiplex sampling these values are transmitted as input addresses into the main storage 2. At the angle value c the basic ignition value of the basic characteristic field 44 is transmitted into the ignition counter 48 as presetting value.

With angle value d the closing time value of the closing time characteristic field is transmitted into the buffer 55. The correction values of the correction characteristic fields 45 and 46 are transmitted during the angle position e into the correction counter 49 and are sign-correctly passed on to the ignition counter 48 at a high clock frequency so that thereby the basic ignition value and the presetting value are corrected.

With angle value f the ignition counter 48 is enabled so that the angle pulses are counted. When the overflow value of the ignition counter 48 is reached, a switching pulse for the generation of the ignition signal is delivered. The switching pulse enables the distance counter 50 and finally is put, via the distributor 51, into the appropriate closing time counter. Thereby the output signal of the specific closing time counter is switched off so that the coil current is interrupted. Thus, an ignition signal is effected.

In addition, the specific closing time counter 52, 53, and 54, is preset and enabled. The buffer 55 makes available the specific closing time value, which is transmitted as presetting value into the specific closing time counter. Starting from a reference value, angle pulses are counted in the closing time counter. The overflow signal represents the switching signal for the switching of the end stage 13, 14, and 15, respectively, so that the coil current is switched on. The coil current flows, until the successive switching pulse of the ignition counter acts upon the specific closing time counter and switches off the coil current.

The coil current is measured in the current measuring circuit 11. The comparator circuit 42 compares the measured value of the coil current with a preset value in the adjusting stage 43. When the presetting value is reached, then the presetting value of the adjusting stage 43 is diminished by one increment, otherwise it is increased. According to that the closing time characteristic field 47 is sampled so that the closing time is permanently kept at an optimum value.

The ignition system may also comprise stages for the thrust disconnection, the speed limitation, and further functions; that is not described in detail.

We claim the following:

1. In an ignition system for an internal combustion engine having a crankshaft and cylinders and wherein angular pulses generated by the crankshaft are utilized to produce a speed pulse signal during each rotation of the engine, with the pulse rate being a function of the speed of the engine, including, a temperature signal that is representative of a temperature in the engine, a load signal representative of the load on the engine, and an octane signal that is representative of the octane value of fuel used with the engine, comprising:

means for storing a basic field of desired characteristic values for the speed pulse signal and the load signal whereby for said respective signal values multiple bit ignition values are stored in the field as representative of the ignition angle related to rotational degrees of the crankshaft;

means for storing a plurality of other correction fields of values characteristic of other engine operating conditions different from engine load and as a function of the speed pulse signal and the engine load signal;

means for generating during each crankshaft rotation a plurality of crankshaft signals successively representative of predetermined angular positions of the crankshaft with respect to a reference position;

means responsive to the crankshaft signals for determining values of the speed pulse signal, engine load and said other engine operating conditions;

means sequentially responsive to the latter values for extracting during each crankshaft rotation from said basic field and the plurality of other correction fields respectively basic ignition angle and ignition correction values; and means for combining said basic ignition angle and ignition correction values to produce ignition switch signals to activate ignitions within the cylinders of the engine during crankshaft rotations.

2. The ignition system in accordance with claim 1 wherein the means for storing a plurality of other correction fields includes:

a first correction field formed of values representative of engine intake temperature as a function of the engine load signal and the speed pulse signal;

a second correction field formed of values representative of engine temperatures as a function of the engine load signal and the speed pulse signal; and a third correction field formed of values representative of the octane value of the fuel as a function of the engine load signal and the speed pulse signal.

3. The ignition system in accordance with claim 2 wherein the combining means includes an ignition counter and a correction counter coupled thereto to alter the value in the ignition counter in accordance with the value in the correction counter;

means responsive to one of said crankshaft signals for storing an extracted basic ignition angle from the basic field in said ignition counter;

means responsive to subsequent ones of said crankshaft signals occuring during one crankshaft rotation for storing extracted ignition correction angle values in the correction counter; and means responsive to one of said crankshaft signals for causing the alteration of the value in the ignition counter with the value in the ignition correction counter.

4. The ignition system in accordance with claim 3 and further comprising:

means for storing, during each crankshaft rotation, sensed values of the operating conditions of the engine; and multiplexer means for successively applying the latter stored values to the extracting means.

5. The ignition system in accordance with claim 2 and further including:

means for generating a current signal representative of the magnitude of the current through an ignition coil used with the engine;

means for storing a current-closing time field of desired values of the time that current is to flow through the coil as a function of values of the speed pulse signal and the current signal;

means responsive to the current signal for extracting from the current-closing time field a value for the time during each crankshaft rotation that current is to flow through the coil; and means for controlling the current through the coil in accordance with the extracted current closing time value.

6. The ignition system in accordance with claim 5 wherein the coil current controlling means includes:

a closing time counter;

means responsive to the extracted current closing time value for presetting the latter counter; and means for sensing an overflow condition of the closing time counter to control the flow of current through the coil.

* * * * *